3,282,881
HOT-MELT ADHESIVE COMPOSITIONS CONSISTING ESSENTIALLY OF ETHYLENE-VINYL ACETATE AND CHLORINATED TERPHENYLS

Thomas P. Flanagan, Greenbrook Township, N.J., assignor to National Starch and Chemical Corporation, New York, N.Y., a corporation of Delaware
No Drawing. Filed Jan. 7, 1965, Ser. No. 424,115
2 Claims. (Cl. 260—33.8)

This invention relates to thermoplastic, hot-melt adhesive compositions. More specifically, it relates to new hot-melt adhesive compositions comprising copolymers of ethylene and vinyl acetate admixed with certain other resinous materials, in combinations possessing superior and unexpected properties.

This application is a continuation-in-part of my copending application Serial No. 95,039, filed March 13, 1961, now abandoned.

The term "resinous materials," as contemplated and used herein, refers to resins consisting essentially of chlorinated aromatic hydrocarbons. More specifically, it refers to chlorinated terphenyl resins containing from about 42% to 60%, by weight, of chlorine. It is to be understood that such specific materials have been set forth herein purely by way of illustration and not in any way as a limitation upon the choice of operable materials.

It is a prime object of my invention to provide new thermoplastic hot-melt compositions based on ethylene/vinyl acetate copolymers having excellent adhesive properties permitting them to be used in a great number of applications for the sealing of a wide variety of solid substrates which may be similar or dissimilar to one another.

It is my further object to achieve these desirable adhesive properties by modifying (reducing the cohesiveness of) the ethylene/vinyl acetate copolymers with the specified "resinous materials."

It is my still further object to reduce the melt-viscosity or cohesive properties of these modified, rubbery, amorphous copolymers to a workable viscosity without appreciably reducing their *adhesive* properties, thereby permitting their application in equipment conventional to the hot-melt adhesives industry.

Hot-melt adhesives are bonding agents which achieve a solid state and resultant strength by cooling, as contrasted with other adhesives, such as pressure sensitive types, which achieve the solid state through evaporation or removal of solvents. Prior to heating, a hot-melt is a thermoplastic material which is in the form of a 100%, by weight, solid. Application of heat melts the solid hot-melt and brings it to the liquid state and, after removal of the heat, it sets by simple cooling. The latter behaviour is in direct contrast to thermosetting adhesives which set or harden by the application of heat and which remain hard upon continued application of heat.

Hot melt adhesives are also distinguished from pressure sensitive adhesives by the fact that when they are in the solid state, either as solid masses or as thin films, their surfaces are hard and devoid of tackiness. In contrast, pressure sensitive adhesives are characterized by their soft, tacky films which are, of course, desirable in such products so that their coated substrates may be readily applied to a wide variety of substrates by the application of nothing more than manual pressure.

Combinations of polymers and copolymers containing ethylene, synthetic resins, rubbers, and the like have been proposed in the past for various kinds of hot-melt adhesive compositions.

The prior known compositions contain a number of constituents in an attempt to assist the properties of the hot-melt adhesive composition such as its melting with heat, its viscosity in the molten state, its adhesiveness, flexibility, stability and other properties which are of importance for a great number of hot-melt adhesive uses. Many of these hot-melt adhesive compositions are often limited in their function as hot-melt adhesives because they are only mediocre with respect to one or more of the essential properties of hot-melt adhesive compositions. Frequently, it has been necessary to compromise these properties in order to get a composition having a very narrow range of useful working properties.

The use of compositions containing from 1 to 80% by weight of an ethylene/vinyl acetate copolymer for reinforcing wax coatings is disclosed in Belgian Patent Number 586,895. These copolymers of ethylene/vinyl acetate may be prepared by copolymerizing a mixture of ethylene and vinyl acetate in the presence of a catalyst such as oxygen, or an organic peroxide such as t-butyl hydroperoxide, in a tubular reactor under manometric pressures ranging from 15,000 lbs. per square inch (1055 kg./cm.$^2$) to about 30,000 lbs./sq. inch (2109 kg./cm.$^2$), and at temperatures ranging from 300° to about 480° F. The copolymer thus obtained is separated from the unchanged residual monomer by eliminating, by instantaneous distillation, the unreacted monomers. By varying the conditions of pressure, temperature, concentration of catalyst and the proportion of vinyl acetate in the monomer mixture, one can obtain copolymers of varying molar proportions of ethylene/vinyl acetate and differing inherent viscosities. Other methods of making the copolymers are known, and may be employed. (Also see British Patent 835,466 published May 18, 1960.)

The copolymers thus prepared are tough, rubbery, amorphous products having a high molecular weight of the order of 200,000 to about 500,000 and an inherent viscosity measured at 86° F. in a 0.25% solution of the copolymer in toluene of 0.45 to 1.5. These copolymers are organophilic, readily miscible with wax, and provide excellent reinforcement for wax coatings. However, as hot-melt adhesive compositions these copolymers are characterized by at least two critical disadvantages. In the first place, they are characterized by a cohesiveness so great as to preclude their use in hot-melt adhesive equipment conventional to the hot-melt adhesives industry. In the second place, they have no substantial *adhesive* characteristics.

I have now found that by modifying the copolymer of ethylene/vinyl acetate with any one of the "resinous materials" noted above, or mixtures thereof, it is possible to obtain hot-melt adhesive compositions which are thermoplastic, i.e. which soften on heating as opposed to thermosetting adhesives which harden on being heated. These novel compositions possess superior and unexpected properties and are suitable for a wide variety of industrial applications.

In general terms, the preparation of the hot-melt adhesive compositions of my invention may be described as follows:

(1) The "resinous material," or mixtures thereof, is placed in a jacketed mixing-pot (or a jacketed heavy-duty mixer of the Baker-Perkins type for compositions having high viscosities) equipped with a stirrer, and the temperature raised to about 300° F. Stainless steel equipment is preferred although other suitable, available equipment may be used, (2) When the resin has melted, stirring is started and the copolymer of ethylene/vinyl acetate is added slowly to prevent lumping.

(3) Stirring and heating are continued until a clear, transparent, homogeneous mass is obtained. The hot-melt adhesive composition, comprising the modified copolymer of ethylene/vinyl acetate, may be used directly, or it may be molten-extruded into rope form, converted to pellets, or placed in cooling pans and held for later use.

The temperature at which the copolymer of ethylene/vinyl acetate is modified may vary from about 250° F. to about 350° F. depending upon the melting temperature of the particular "resinous material" or mixtures thereof. A temperature of 300–350° F. is preferred.

Although copolymers of ethylene/vinyl acetate may range from about 4–16 mols ethylene/mol vinyl acetate and having inherent viscosities of about 0.6–1.5, I prefer amorphous copolymers containing 4–8 mols ethylene/mol vinyl acetate having an inherent viscosity of about 0.6–1.2, as determined in toluene at 86° F. and a molecular weight of about 200,000–500,000.

I can add varying amounts of the modifying "resinous material" to the ethylene/vinyl acetate copolymer. For example it is within the scope of my invention to add as much as 400 parts (by weight) of the modifying "resinous material" to 100 parts (by weight) of the copolymer. On the other hand, as little as 25 parts (by weight) of the modifying "resinous material" may be added to 100 parts of the copolymer. The amount of the modifier to be used will be determined largely by the particular industrial use intended for the hot-melt adhesive composition, as will be noted below.

It is an advantage of my new hot-melt adhesive compositions that they are simply and easily prepared; they have excellent adhesive properties for direct sealing (or direct bonding) while still retaining much of their original cohesive, or rubbery, properties; they are useful for a wide variety of direct-adhesive industrial applications; they show no viscosity build-up or separation of components while kept in the molten state as contrasted with many hot-melt adhesive compositions of the prior art; furthermore, they may be applied in all types of conventional hot-melt equipment.

It is a special advantage of my new hot-melt adhesive compositions that they have superior and unexpected properties and are suitable for a wide-range of industrial applications. Compositions containing about 20–30% ethylene/vinyl acetate copolymer modified with about 80–70% of the "resinous material" are characterized by many valuable properties. They have a relatively low viscosity at temperatures of 250–350° F., and can be handled in conventional equipment using a roller applicator; they are soft and flexible while maintaining resistance to flow; they adhere to a wide variety of solid substrates; they are 100% solid and contain no volatile vehicle which has to be removed during application; they are useful for adhering a variety of similar and dissimilar solid substrates.

Compositions comprising about 45% ethylene/vinyl acetate copolymer modified with 55% of the "resinous material" are characterized by fast bonding time (setting speed); adhesion to a wide variety of surfaces; great toughness; resistance to deformation at elevated temperatures (up to 130° F.); good flexibility at low temperatures (as low as 20° F.); can be handled in various physical forms including pellets, granules, or diced, for use in the "extruder" in rope or cord form for use in the appropriate applicator; or in lumps for use in conventional equipment; and are especially valuable as hot-melt adhesive compositions for the perfect binding of books and making waxglassine bags where a "paper-tearing" bond is achieved without the use of solvents and at greatly increased production rates.

Compositions comprising about 80% of the ethylene/vinyl acetate copolymer and modified with 20% "resinous material" are characterized by great toughness; fastest bonding time of any of the compositions listed above with excellent adhesiveness to a wide variety of similar and dissimilar surfaces; greater resistance to deformation up to temperatures of about 200° F. while maintaining excellent low-temperature flexibility; they can be handled conveniently in various forms such as pellets, diced, or granules for use in an extruder or in rope form in the appropriate applicator; they are useful as hot-melt adhesive compositions for adhering metals to polyethylene and polyester films where heat resistance, or extremely fast bonding time is required, such as in sealing packages containing hot foods and the like.

The following examples will further illustrate the embodiment of my invention. All parts are by weight, unless otherwise specified.

*Example I*

| | Parts |
|---|---|
| Copolymer of ethylene/vinyl acetate | 35 |
| A chlorinated terphenyl resin containing 54%, by weight, of chlorine | 65 |

The chlorinated terphenyl resin is placed in an oil-jacketed, stainless-steel mixing pot equipped with a stainless-steel stirrer. The pot is first heated to about 300° F., the chlorinated terphenyl resin added, and melted. Stirring is then started and the copolymer added slowly to prevent lumping. The copolymer is an amorphous, rubbery material containing about 5.4 mols ethylene per mol vinyl acetate, having an inherent viscosity of about 0.98, as determined in toluene at 86° F. and a molecular weight of about 400,000 to 500,000. Stirring and heating are continued until a clear, homogeneous, transparent mass is obtained. The modified-copolymer composition is fluid at about 300 to 375° F. and is a low-cost, flexible, fast-setting adhesive. At these temperatures (300–375° F.) it could be coated on paper, glass, metal, fabrics, wood, plastic films, including polyethylene and polyester films, to obtain thermoplastic coatings having exceptionally high adhesion to the surfaces to which they were applied. If desired, the coated surfaces could be directly bonded to other similar and dissimilar surfaces.

When the above example was repeated omitting the chlorinated terphenyl resin, the resulting *unmodified* copolymer had no adhesive properties when applied to glass, papers, metals, fabrics, films, wood and the like, and at 350° F. it was so *cohesive* that its viscosity could not be determined by a Brookfield Viscometer.

*Example II*

The procedure of Example I is repeated using, however, the following formula:

| | Parts |
|---|---|
| Copolymer of Example I | 40 |
| Chlorinated terphenyl resin containing 42%, by weight, of chlorine | 60 |

The modified copolymer is fast-setting and forms a rigid thermoplastic adhesive for Mylar (polyester) films.

When a copolymer of ethylene/vinyl acetate having about five mols ethylene per mol vinyl acetate, an inherent viscosity of about 0.7, as determined in toluene at 86° F., and a molecular weight of about 300,000 is used in place of the copolymer of Example I, the fluid, hot-melt composition has better penetration for porous stock; otherwise, its adhesive properties are generally similar to the modified product described above.

*Example III*

In this example, the modifying procedure of Example I is followed except a mixture of chlorinated terphenyl resins is used. The formula follows:

| | Parts |
|---|---|
| Copolymer of ethylene/vinyl acetate of Example I | 45 |
| Chlorinated terphenyl resin containing 54%, by weight, of chlorine | 45 |
| Chlorinated terphenyl resin containing 60%, by weight, of chlorine | 10 |

Both of the modifying "resinous materials" are added to the hot pot and melted before the copolymer is added. At 350° F. the modified copolymer can be applied to sheets of similar and dissimilar materials to form a thermoplastic coating which has excellent bonding strength.

*Example IV*

In the following example, films of the hot-melt adhesive composition of Example III are evaluated for tensile strength, cold flow at 120° F. and cold crack.

The films are prepared by means of a heated Bird applicator, the hot-melt adhesive composition being cast on a Teflon-coated steel sheet to give a film thickness of about 20 mils. After cooling, the films are stripped from the plate and tested as follows:

(1) For tensile strength, Test Method A of the American Society for Testing Materials (ASTM) D882–56T is followed, using an Instrom Tensile Tester.

(2) For cold flow: Cold flow as contemplated in this invention relates to the softness property of the hot-melt adhetive which permits the film to elongate or stretch when a load is applied at a given temperature. As the temperature is increased, the cold flow increases under the same load. This measurement is made to determine the property of hot-melt adhesive compositions useful for perfect binding books. A hot-melt adhesive composition with high cold-flow will permit a perfect bound book to be easily distorted and the book will "flow apart" under stress, as when the book is folded back-to-back by the reader for ease in reading. The test is made on a strip (of the above adhesive film) measuring ½ x 2 inches. The film is held between clamps leaving a center area one inch long exposed. A 3-oz. weight is attached to one of the clamps and the specimen attached to a support by means of the other clamp. The tests are generally made at 72° F. The amount (percent) of elongation after *five* minutes is termed "cold flow."

(3) Cold-crack temperature: Cold-crack temperature as contemplated in this invention relates to the hardness or brittleness property of the hot-melt adhesive film which causes the film to fracture when it is bent. The test is made on strips of the adhesive film measuring ¼ x 2 inches. One of the strips is immersed in water having a given low temperature for a period of three minutes. Only one film is tested at a time. The film is then held by forceps gripped at the two ends and bent to 360°. If the film does not crack at the particular temperature at which the test is made, the temperature of the bath is lowered and the test is repeated. The temperature at which the film cracks is defined as the "cold-crack temperature." It is obvious that the lower the cold-crack temperature, the lower the temperature at which the book may be handled without "falling apart." This is especially valuable for the military who are required to use their manuals in cold climates, or in more moderate climates during the winter months. The results of these tests follow:

|  | Film from Ex. III | Present Commercial Films |
|---|---|---|
| Tensile strength | 470 p.s.i | 300–500 p.s.i. |
| Cold flow (72° F.) | 0% | 200%–300%. |
| Cold flow (120° F.) | 0% | "Flow apart." |
| Cold crack | Less than 19° F | 35–51° F. |

It will be observed that at 72° F. present commercial films comprising other copolymers of vinyl acetate have an elongation of 200% to 300%, whereas the films of Example III showed 0% elongation at this temperature. In order to check the temperature at which the films of Example III might show cold flow, the tests were repeated at temperatures up to 120° F., and no measurable cold flow was noted (results in above table).

For hot-melt adhesive compositions having high viscosities it may be more economical to modify the copolymer in a jacketed dough mixer rather than in the melting pot. The particular equipment to be used will be apparent to those skilled in the art.

Variations in materials, proportions and procedures will be apparent to the practitioner, without departing from the scope of this invention, which is limited only by the following claims.

I claim:

1. A composition comprising a solid, thermoplastic, hot-melt adhesive capable of bonding similar and dissimilar solid substrates, said composition consisting essentially of 100 parts by weight of a copolymer of ethylene and vinyl acetate and from 25 to 400 parts, by weight of the copolymer, of a resinous material consisting of a chlorinated terphenyl resin containing from about 42% to 60%, by weight, of chlorine.

2. The composition of claim 1, wherein the copolymer of ethylene and vinyl acetate has a molecular weight of about 200,000 to about 500,000, an inherent viscosity of about 0.6 to 1.5 as determined in toluene at 86° F., and consists of about 4 to 16 moles of ethylene per mole of vinyl acetate.

References Cited by the Examiner

UNITED STATES PATENTS

| 2,485,248 | 10/1949 | Watson et al. | 260—31.6 |
| 2,622,056 | 12/1952 | De Coudres et al. | 260—33.8 |
| 2,643,238 | 6/1953 | Crozier et al. | 260—33.8 |
| 2,947,710 | 8/1960 | Frantz | 260—33.8 |
| 3,025,167 | 3/1962 | Butler | 260—27 |

MORRIS LIEBMAN, *Primary Examiner.*

J. E. CALLAGHAN, *Assistant Examiner.*